(12) United States Patent
Mitsuji et al.

(10) Patent No.: US 8,166,508 B2
(45) Date of Patent: Apr. 24, 2012

(54) CONTENT RENTAL SYSTEM

(75) Inventors: Hiro Mitsuji, San Francisco, CA (US); Alan Ward, Boulder, CO (US); Mihailo Despotovic, Santa Clara, CA (US); Sam Gharabally, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 922 days.

(21) Appl. No.: 12/013,850

(22) Filed: Jan. 14, 2008

(65) Prior Publication Data

US 2009/0178070 A1 Jul. 9, 2009

Related U.S. Application Data

(60) Provisional application No. 61/019,163, filed on Jan. 4, 2008.

(51) Int. Cl.
*H04N 7/173* (2006.01)
*H04N 5/783* (2006.01)
(52) U.S. Cl. ............................ 725/93; 705/902; 386/349
(58) Field of Classification Search .......................... None
See application file for complete search history.

(56) References Cited

U.S. PATENT DOCUMENTS

| 5,925,127 | A | 7/1999 | Ahmad |
| 6,538,635 | B1 | 3/2003 | Ringot |
| 6,609,253 | B1 | 8/2003 | Swix et al. |
| 7,010,801 | B1 | 3/2006 | Jerding et al. |
| 2001/0036271 | A1 | 11/2001 | Javed |
| 2002/0073033 | A1 | 6/2002 | Sherr et al. |
| 2002/0188960 | A1* | 12/2002 | Rodriguez et al. ............ 725/120 |
| 2004/0133923 | A1* | 7/2004 | Watson et al. ................. 725/134 |
| 2005/0034171 | A1* | 2/2005 | Benya .......................... 725/143 |
| 2005/0204019 | A1 | 9/2005 | Flynn et al. |
| 2005/0281540 | A1* | 12/2005 | Inokuchi et al. ................ 386/94 |
| 2006/0010075 | A1* | 1/2006 | Wolf .............................. 705/57 |
| 2007/0168539 | A1* | 7/2007 | Day .............................. 709/231 |
| 2007/0174888 | A1* | 7/2007 | Rubinstein ................... 725/115 |

FOREIGN PATENT DOCUMENTS

| EP | 1734452 | 12/2006 |
| JP | 2004-179960 | 6/2004 |
| JP | 2004-297550 | 10/2004 |
| JP | 2004-348384 | 12/2004 |
| JP | 2006-004543 | 1/2006 |
| JP | 2007-156508 | 6/2007 |
| KR | 100701007 | 3/2007 |
| WO | WO 02/23311 | 3/2002 |

OTHER PUBLICATIONS

International Search Report and Written Opinion in PCT application PCT/US2008/088624 dated Apr. 14, 2009, 28 pages.
Notice of Preliminary Rejection (English Translation) in Korean Patent Application No. 10-2010-7017389, dated Jun. 3, 2011, 6 pages.

* cited by examiner

*Primary Examiner* — Mark D Featherstone
(74) *Attorney, Agent, or Firm* — Fish & Richardson P.C.

(57) ABSTRACT

A content rental system includes one data store for storing rental content. The content rental system also includes a content server for transferring content to one viewing device based upon a received request. The content server is further configured to authorize the transfer of the content from the viewing device to another viewing device.

26 Claims, 7 Drawing Sheets

CONTENT RENTAL SYSTEM

CLAIM OF PRIORITY

This application claims priority under 35 USC §119(e) to U.S. patent application Ser. No. 61/019,163, filed on Jan. 4, 2008, the entire contents of which are hereby incorporated by reference.

BACKGROUND

This disclosure relates to a system for providing and managing rental of content such as video content.

Cinemas and theaters have a long history of providing movies to be viewed in a group environment. However, with the evolution of home electronics industry, equipment such as video cassette recorders (VCR) and digital videodisc (DVD) players may be used for movie viewing at a residence or other type of location. Along with current releases and older movies, other types of video content (e.g., television programs, etc.) may be reproduced and provided for rental by consumers. Correspondingly, a video rental industry has emerged to provide viewers with video content for nearly every interest and genre. For example, a consumer may visit a brick-and-mortar video rental store and select one or more DVDs for rental for a predefined period of time (e.g., three days, etc.). With the ever-expanding use of the Internet, movies and other types of video content may also be rented and downloaded electronically from Internet websites. By accessing a website, a customer may select a movie of interest and provide payment for the rental (e.g., by providing a credit card number). Correspondingly, the video content of the movie may be streamed to a web browser executing on the customer's computer system and rendered on a display.

SUMMARY

Disclosed herein are systems and methods for managing the rental of video content that may be viewed on one or more types of viewing devices. Additionally, the rented video content may be transferred from one viewing device to another viewing device. By checking-out video content from a video rental system, the content may be viewed initially on a first device. The video content may then be checked-in to the video rental system and checked-out for viewing on another viewing device if the customer and viewing device are recognized and authorized by the system. The number of subsequent devices on which the video content may be viewed can be limited to two, three or essentially any desired whole number depending on the business mode employed by the operator of the video renting system.

In some implementations, a method includes transferring content from a content rental system to one viewing device based upon a received request. The method also includes authorizing the transfer of the content from the viewing device to another viewing device.

In other implementations, a content rental system includes one data store for storing rental content. The content rental system also includes a content server for transferring content to one viewing device based upon a received request. The content server is further configured to authorize the transfer of the content from the viewing device to another viewing device.

In still other implementations, one or more computer readable media store instructions that are executable by a processing device, and upon such execution cause the processing device to perform operations that include transferring content from a content rental system to a viewing device based upon a received request. Execution of the instructions also cause the processing device to perform operations that include authorizing transfer of the content from the viewing device to another viewing device.

In another implementation, a content rental system includes a content server for transferring video content, based upon a received request, to a viewing device registered with the content rental system. The content server is further configured to authorize the transfer of the video content from the viewing device to another viewing device registered with the content rental system. Transferring the content from the first to the second viewing device includes the first viewing device checking the video content into the content server and the second viewing device checking the video content out of the content server. The content server is further configured to initiate a content rental period and a content viewing period. The content rental period defines a period of time during which playback of the video content is to be initiated and the content viewing period defines a period of time during which playback of the video content is to be completed.

The content rental system also includes a data store for storing data representative of the first and second viewing devices being registered with the content rental system. The data store also stores data representative of customers registered with the content rental system. Data representative of the first and second viewing devices is associated with data representing a corresponding customer. The content rental system also includes a digital rights management (DRM) server for providing at least one key for decrypting video content for playback upon receiving a request for playback. The content rental system also includes another data store for storing keys for decrypting video content for playback.

These and other aspects and features and various combinations of them may be expressed as methods, apparatus, systems, means for performing functions, program products, and in other ways.

Other features and advantages will be apparent from the description.

DETAILED DESCRIPTION

Figure 1:
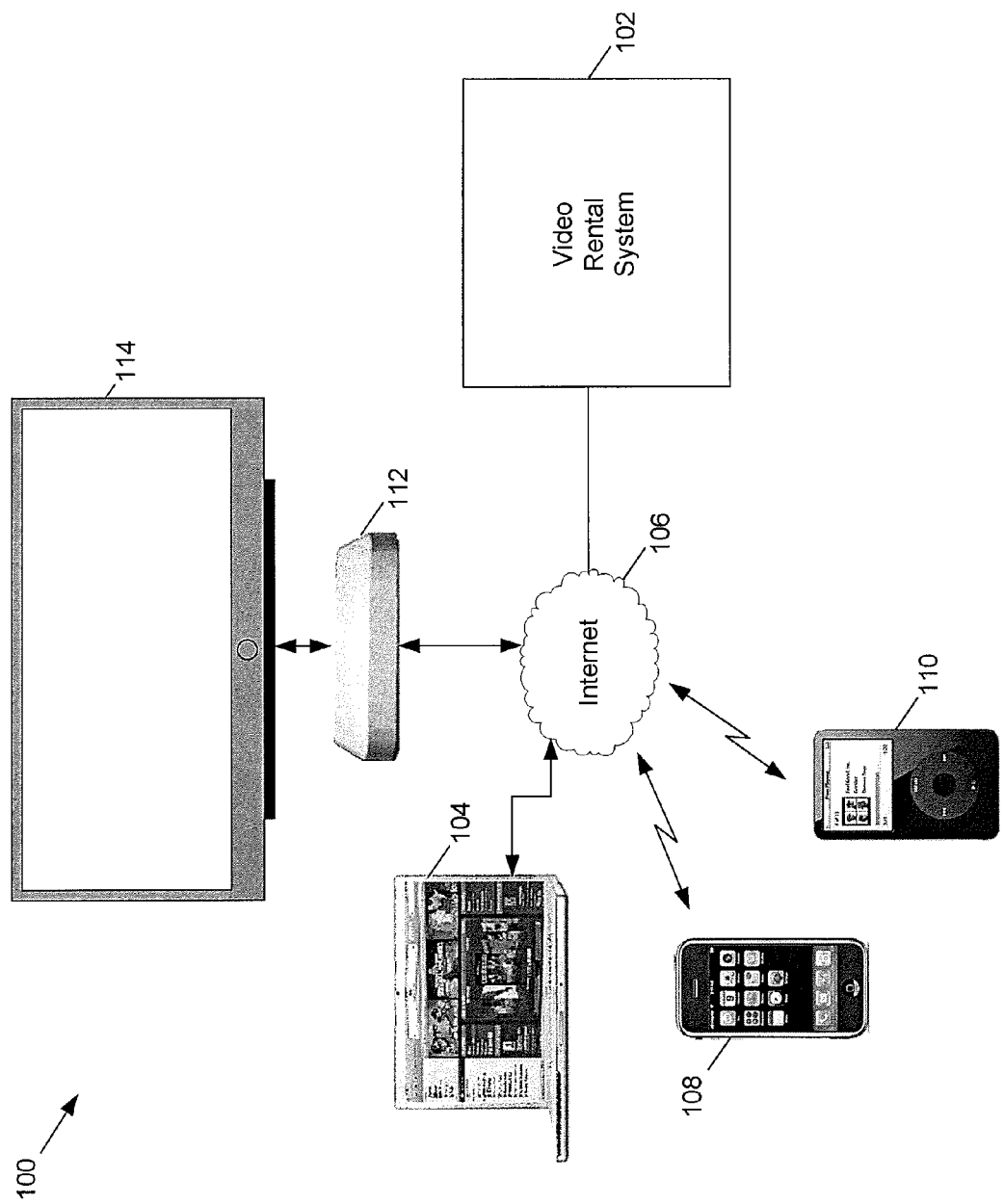
FIG. 1 is a block diagram of a video rental system in communication with a variety of viewing devices.

Referring to FIG. 1, a network environment 100 includes a video rental system 102 that allows customers to select and rent one or more video titles (e.g., movies, television shows, etc.) for selective playback on one or more electronic viewing devices associated with the customer. For example, a customer may send a rental request for a particular movie from a computer system 104 (e.g., a laptop computer) to the video rental system 102 via the Internet 106. In some arrangements, the rental request may be initiated by a software application, which transfers music, photo and video content (e.g., "iTunes" application from Apple, Inc. of Cupertino, Calif.), and is executed by the computer system 104. Along with the video selection, other information may be provided to the video rental system 102 such as payment information (e.g., credit card number), user information (e.g., user account number), etc. In some arrangements the request may also identify the particular viewing device that the user would like to view the video. For example, the computer system 104 may be used to view a selected movie, or, another device associated with the customer may be requested as the viewing destination. Typically, the video rental system 102 stores information that represents each device associated with a particular customer (e.g., registered with the video rental system 102 along with the customer). In this illustration, the video rental system 102 is aware of a cellular telephone 108 (e.g., an "iPhone" also from Apple, Inc. of Cupertino, Calif.), a media player 110 (e.g., an "iPod" from Apple, Inc.) and a digital media receiver 112 (e.g., an "Apple TV" also from Apple, Inc.) that is connected to a display 114.

Along with video content, other types of content may rented a rental system. For example, audio content (e.g., music, lectures, etc.), data (e.g., graphics, text, etc.) and other types of content may be rented.

Once the request is received by the video rental system 102, the system attempts to authorize the rental transaction (e.g., check user identification information, check payment method, check content policy, etc.) and identify the destination of the video content (e.g., check registration of requested destination viewing device). Once the transaction has been authorized, the video rental system 102 initiates transfer of the appropriate video content (e.g., video files) to the requested destination. Additionally, one or more processes may be triggered by the video rental system 102 to execute other operations (e.g., payment collection).

Once a rental is granted, the video rental system may set one or more restrictions on viewing the video content. For example, the customer may be constrained to a predefined rental period of time (e.g., 30 days) during which the content may need to be viewed after being downloaded. The customer may also be constrained to a particular viewing period (e.g., 24 hours) during which viewing of the video content needs to be completed once playback of the video has initiated. Various other types of constraints and restrictions may also be implemented to provide reasonable rental and viewing periods. For example, if the customer is viewing a video, and the rental period (e.g., 30 days) and/or the viewing period (e.g., 24 hours) expires, the customer may still be allowed to complete viewing the video. However, the customer may be warned that if video playback is paused or stopped from this point in time forward, video playback may not be restarted.

During the rental period, the customer may also transfer the video content from one viewing device to another device. For example, the customer may initially request to view a particular piece of video content on the digital media receiver 112 and the corresponding display 114. At a later time, the customer may be interested in viewing the video content on the media player 110. By alerting the video rental system 102 to the customer's interest to transfer, the video content may be provided to the new destination device. In one arrangement, the video content may first be provided back to the video rental system 102, in effect to "check-in" the video content. A request may then be sent to the video rental system 102 to "check-out" and provide the video content to another viewing device (e.g., the media player 110). While managing the transfer of the video content from one device to another, the video rental system 102 may or may not account for this transfer in regards the rental period and/or the viewing period. For example, the period of time needed to process a "check-in" and "check-out" request may be added to rental period to account for the possibility of transfer delay.

As mentioned above, various types of video content may be provided. For example, standard definition (SD) and high definition (HD) video content may be rented for playback on one or more viewing devices (e.g., the digital media receiver 110). LC video content may also be rented for playback on a device capable of processing such video content (e.g., the computer system 104). Other features, which may also be selectable, may also be provided, for example, alternate audio (e.g., dubbed tracks, director's commentary, etc.), subtitles, chaptering, custom audio (e.g., Dolby Surround, audio mixing, stereo, etc.), closed captioning, down-mixing to stereo, etc.

In addition to managing rental activities, the video rental system 102 may also provide the functionality for purchasing video content which may then be freely transferred among viewing devices associated with the customer.

Figure 2:
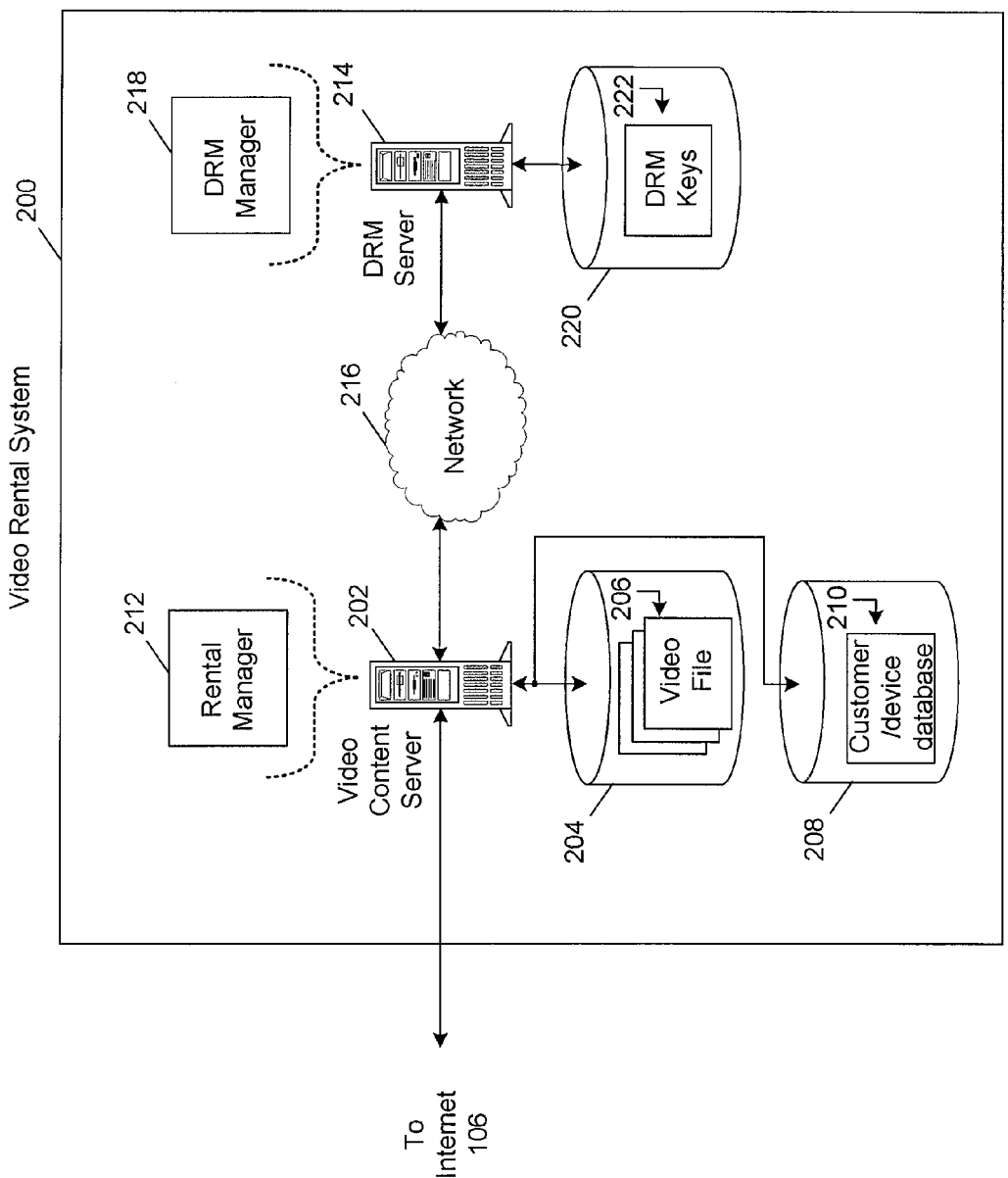
FIG. 2 is a block diagram of an exemplary video rental system.

Referring to FIG. 2, an exemplary video rental system 200 includes a video content server 202 that manages available video content, customer and viewing device information, and rentals. For example, in this arrangement, a storage device 204 illustrates the available video content that may be rented from the video rental system 200. Along with hard drives, CD-ROMs and redundant arrays of independent disks (RAIDs), one or more other data storing devices, techniques and methodologies may be implemented for video content storage. In this illustration, the rentable video content is represented by a group of video files 206. The video content server 202 is also in communication with another storage device 208 that stores information associated with customers, viewing devices, etc. For example, a customer/device database 210 may be stored in the storage device 208 and include information such as customer identification information, viewing device registration information, etc. Additional storage devices may also be in communication with the video content server 202 for additional information storage and to assist in video rental (and purchasing). Various type of data formats, structures and protocols may be used to represent information, for example, globally unique identifiers (GUIDs) may be used to identify particular information.

To process and manage rental requests (e.g., check-out requests, check-in requests, etc.), a rental manager 212 is executed on the video content server 202. For example, along with checking customer identification, authorizing transactions, and registering and tracking viewing devices associated with customers (e.g., computer systems, iPhones, iPods, AppleTv's, etc.), the rental manager 212 may provide other functionality such as providing rental suggestions (e.g., tracking and providing the most popular rentals, suggested selections for particular movie genres, new releases, etc.). Search functions along with browsing, previewing, providing third-party reviews, and customer account history and billing information may be managed by the rental manager 212. Generally, a manager such as the rental manager 212 is an automated or semi-automated process or component that may be executable by a computing device.

The video rental system 200 also includes a digital rights management (DRM) server 214 that is in communication with the video content server 202 via a network 216 (e.g., a local area network (LAN), wide area network (WAN), hard-wire connection, etc.). In general, the DRM server 214 is associated with the identification, protection, monitoring and tracking of content policy including management of policy holders. For example, the DRM server 214 may authorize the "check-in" and "check-out" of video content from the video content server 202. Upon receiving a rental request, the video content server 202 may send a request to the DRM server 214 to authorize the "check-out" of the requested video content. In some arrangements, a group of authorization requests may be provided and processed by the DRM server 214, or single authorization request may be provided to the DRM server that represents multiple transactions. Once authorized (and after performing some eligibility checks), the video content server 202 may be contacted and instructed to release the video content for transfer. In this arrangement, such functionality is provided by a DRM manager 216 that is executed by the DRM server 214.

In some arrangements, the DRM manager 218 may assist in providing one or more security keys so that downloaded video content may be played back. For example, upon a rental being authorized by the rental manager 212, the DRM manager 218 may provide one or more DRM keys for delivery to the viewing device so that the video content may be decrypted. In this illustration, a storage unit 220 is in communication with the DRM server 214 and stores DRM keys 222 and possibly other types of DRM and security information. In one scenario, upon a customer initiating playback of a downloaded video on a viewing device, a request is provided to the video rental system 200 to provide the appropriate DRM key. Once the request is authenticated by the rental manager 212, the DRM manager 218 is requested to provide the appropriate DRM key, which is in turn sends the key to the appropriate viewing device. While this particular arrangement uses DRM keys for video content decryption, other encryption and security techniques and methodologies may be implemented individually or in combination. For example, one DRM key may be provided for initiating a rental period of a video and another key may be provided for initiating a viewing period for the video.

Figure 3:
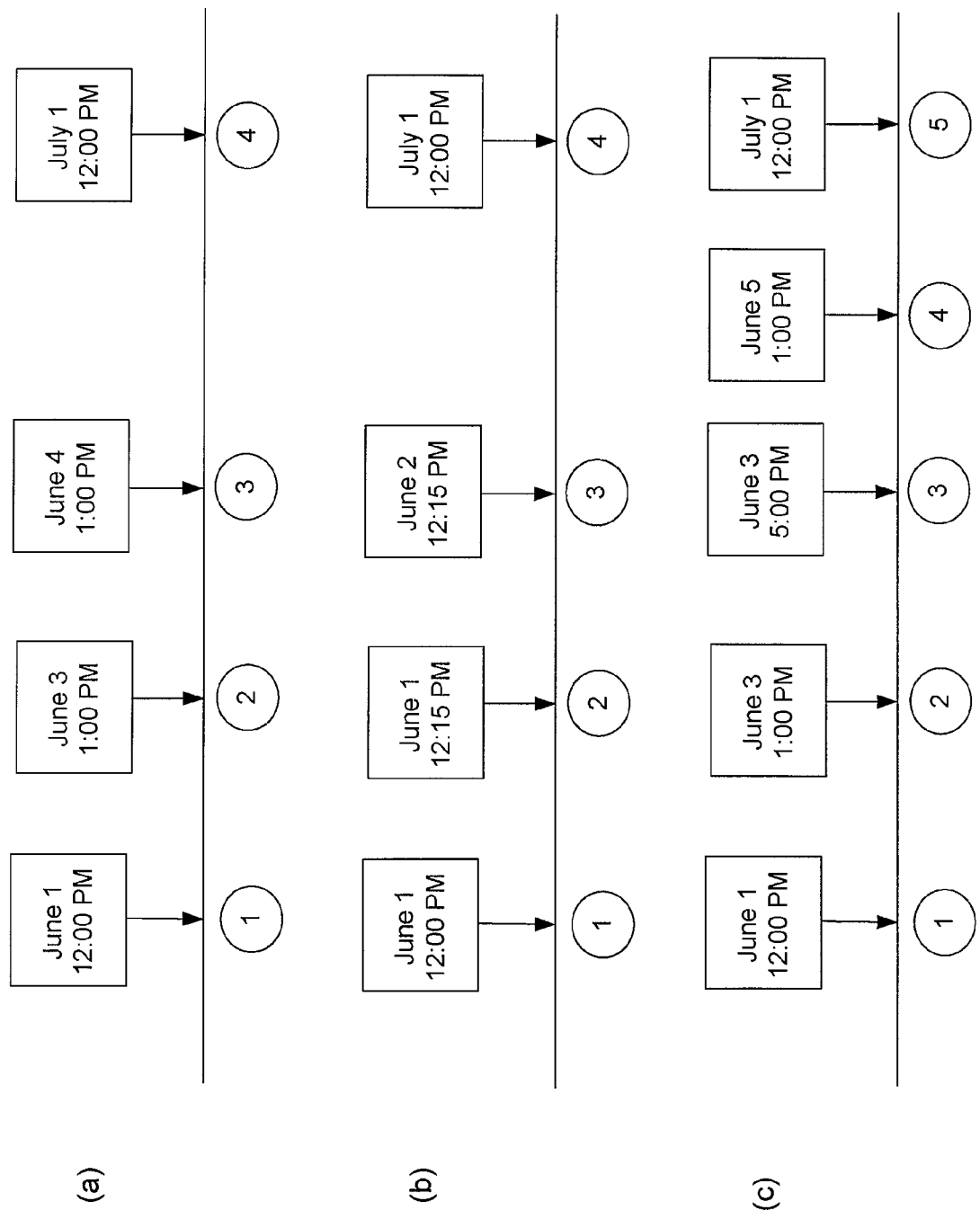
FIGS. 3 and 4 are timing diagrams representative of various video rental scenarios.

Referring to FIG. 3, a series of three timelines are illustrated to represent three rental scenarios and the restrictions applied by the rental period (e.g., 30 days) and the viewing period (e.g., 24 hours). In FIG. 3(a), at time 1 (i.e., 12:00 PM, June 1), video content has been requested and downloaded from the video rental system 200. Correspondingly at time 1, the thirty-day rental period begins and is tracked by the video rental system. At time 2 (i.e., 1:00 PM, June 3), the customer initiates viewing of the video content on a viewing device, thereby triggering the twenty-four hour viewing period. Additionally, a DRM key is provided from the video rental system to the viewing device for video decryption. At time 3 (i.e., 1:00 PM, June 4) the twenty-four hour period has expired and the video content may no longer be viewed. Since time 3 cuts off the possible viewing of the movie, time 4 (i.e., 12:00 PM, July 1), which represents the expiration of the thirty-day rental period, is irrelevant for this scenario in regards to restricting the viewing of the video content.

In FIG. 3(b), a time series illustrates a scenario in which a customer starts viewing before the downloading of video content is complete. At time 1 (i.e., 12:00 PM, June 1) a rental request is provided by a customer and approved by the video rental system. Additionally, at time 1 downloading of video content is initiated. At time 2 (i.e., 12:15 PM, June 1), the customer begins viewing the video content before downloading is complete. Accordingly, a DRM key is provided and the twenty-four hour content viewing period starts at time 2 and expires at time 3 (i.e., 12:15 PM, June 2). As such, the end of the thirty-day rental period, time 4 (i.e., 12:00 PM, July 1) does not factor into the scenario if viewing is complete by time 3.

In FIG. 3(c), a time series illustrates a scenario in which viewing of a rented video is paused. At time 1 (i.e., 12:00 PM, June 1), a rental request is processed and the video content of interest is downloaded, thereby triggering the thirty-day rental period. At time 2 (i.e., 1:00 PM, June 3), upon being initiated by the customer, a DRM key is delivered and viewing of the video content begins, thereby initiating the twenty-four hour viewing period. At time 3 (i.e., 5:00 PM, June 3), the customer pauses playback of the video content until time 4 (i.e., 1:00 PM, June 5), approximately almost two days later. While, the twenty-four hour viewing period has expired by time 4, the customer is able to continue viewing of the video content so long as the video is not paused a second time (or stopped). In some arrangements, a upon restarting playback of the video content after the twenty-four hour viewing window has expired, a warning (e.g., a graphic, audible tone, etc.) is displayed over the video content to alert the customer not to pause or stop the video. Similar to the scenarios described in FIGS. 3(a) and (b), since viewing of the video content being restricted by the twenty-four hour viewing period, expiration of the thirty-day rental period, at time 5 (i.e., 12:00 PM, July 1) is irrelevant for this scenario.

Figure 4:
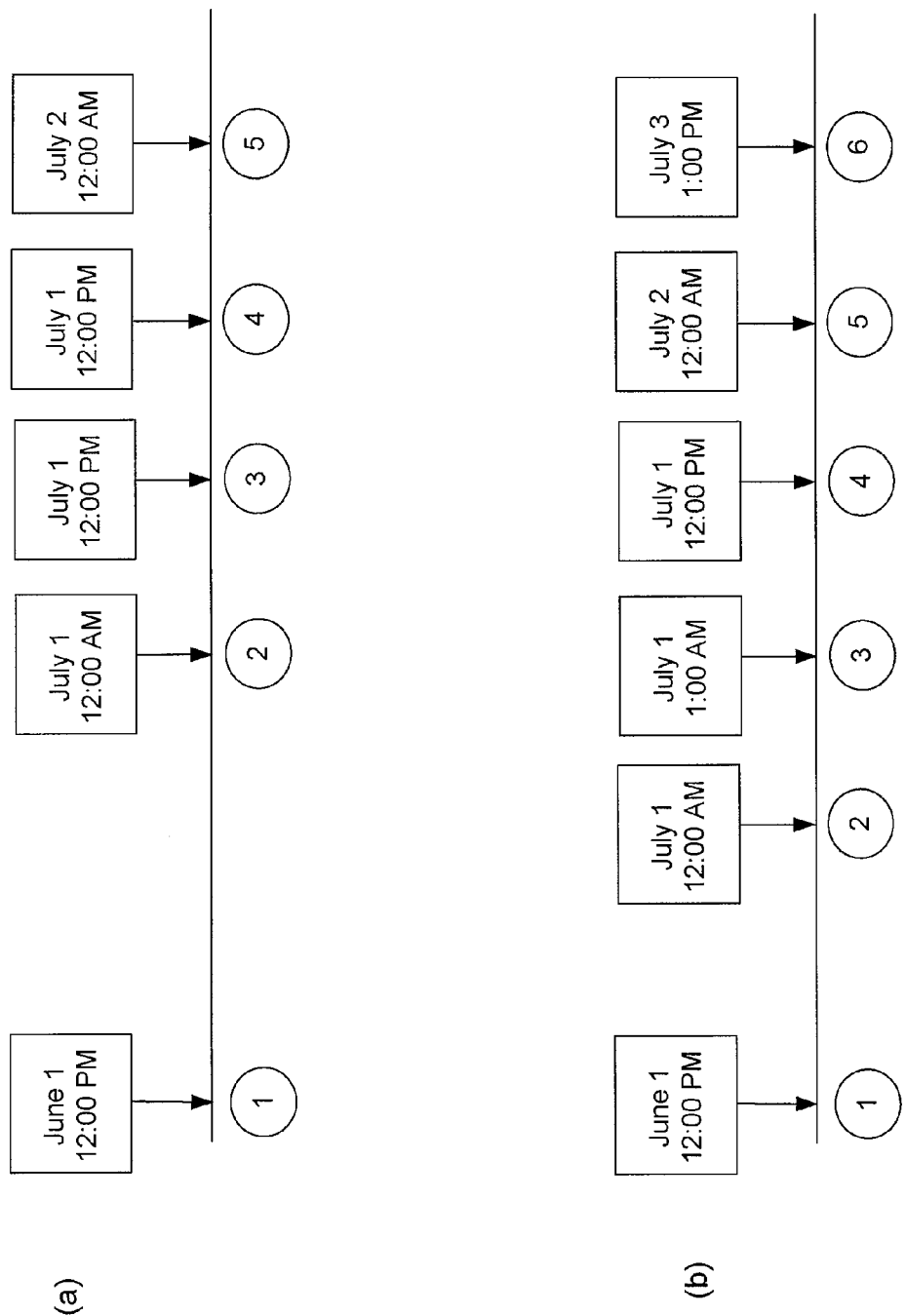

Referring to FIG. 4, two additional timelines are illustrated that also represent viewing scenarios. Both timelines are associated with scenarios in which the thirty-day rental period is exceeded. In FIG. 4(a), once again at time 1 (i.e., 12:00 PM, June 1) a video rental is initiated by a customer, the selected video content is downloaded and the thirty-day rental period initiates. At time 2 (i.e., 12:00 AM, July 1), which is twenty-nine days into the rental period, the customer initiates viewing of the video and delivery of the appropriate DRM key. Thereby, the twenty-four hour viewing period starts at time 2. At time 3 (i.e., 12:00 PM, July 1) the customer stops playback of the video content. At time 4 (i.e., 12:00 PM, July 1) the thirty-day rental period expires, and in this implementation based upon the expiration of this period, the customer is blocked from restarting playback of the video. As such, for any time after time 4, including time 5 (i.e., 12:00 AM, July 2) which represents the expiration of the twenty-four hour viewing period, the customer is unable to view the video.

In FIG. 4(b), a timeline represents the scenario in which video playback is initiated twenty-nine days after rental, is paused, and passes beyond a thirty-day rental period. Once again, at time 1 (i.e., 12:00 PM, June 1) a video rental is initiated by a customer, the selected video content is downloaded and the thirty-day rental period initiates. At time 2 (i.e., 12:00 AM, July 1), which is twenty-nine days into the thirty-day rental period, a DRM key is received and viewing starts along with the twenty-four hour viewing period. At time 3 (i.e., 1:00 AM, July 1) the customer pauses the video playback (i.e., one-hour after initiating viewing of the video). Time 4 (i.e., 12:00 PM, July 1) represents the time when the thirty-day rental period expires and time 5 (i.e., 12:00 AM, July 2) represents the expiration of the twenty-four hour viewing period. At time 6 (i.e., 1:00 PM, July 3), the customer attempts to restart playback of the video content, and is allowed, in this arrangement, to continue viewing of the video so long as the playback is not paused (a second time) or stopped prior to completion of the video content.

Figure 5:
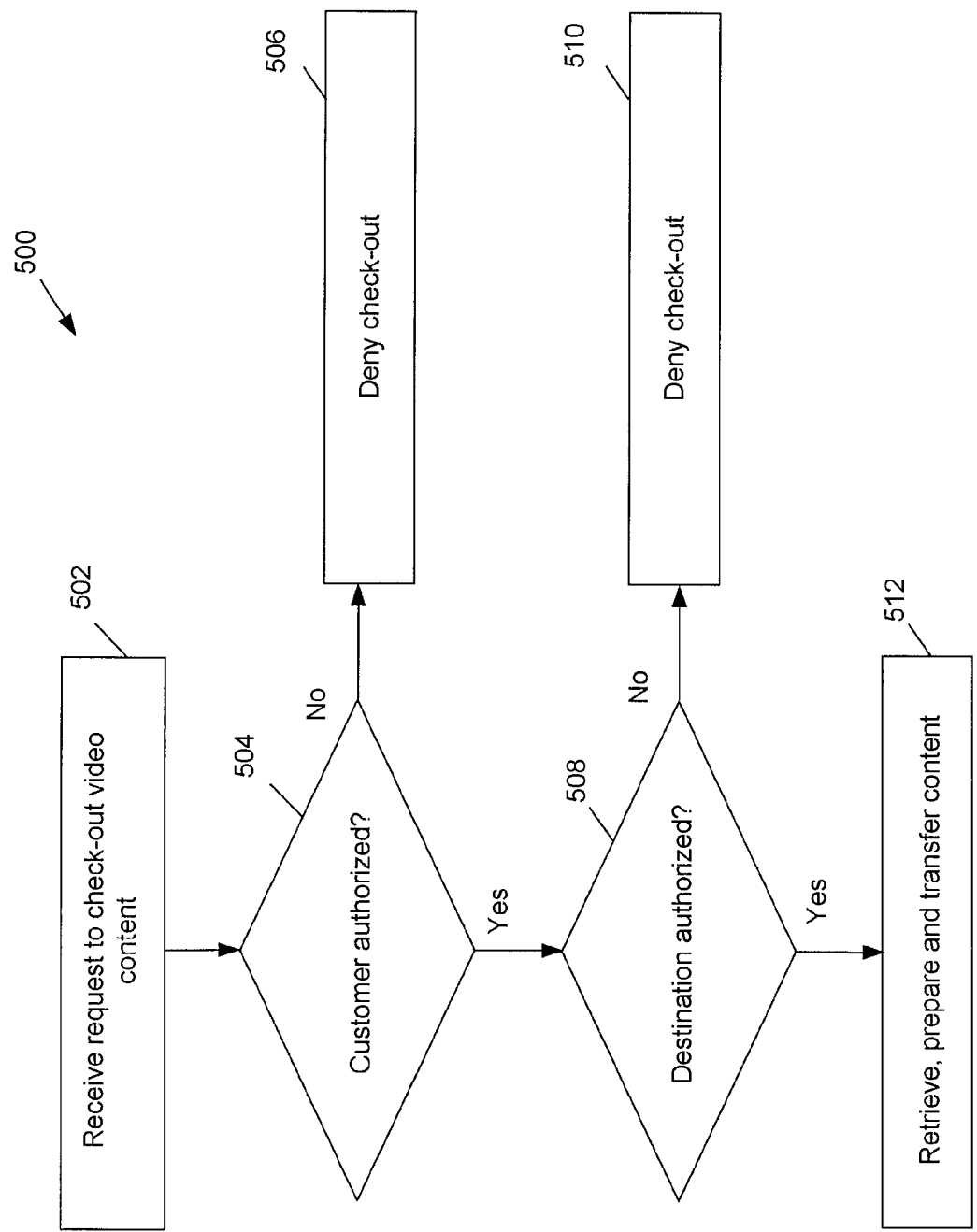
FIGS. 5 and 6 are flow charts that represent operations of a video rental manager.

Referring to FIG. 5, a flowchart 500 represents some of the operations of the rental manager 212 (shown in FIG. 2). As mentioned above, the rental manager 212 may be executed at the video content server 202, which may be implemented as a computer system or other type of computation device. Along with being executed at a single site (e.g., video content server 202), operation execution may be distributed among two or more computation devices. For example, some operations may be executed by two or more servers.

Operations of the rental manager 212 may include receiving 502 a request to check-out video content from the video rental system. Upon receipt of the request, operations of the rental manager 212 may include determining 504 if the customer is authorized to make such a request. For example, the request may be checked for appropriate customer identification information to authorized the customer. By comparing the request information with data stored in the customer/device database 210, authorization may be determined. If the customer is not authorized, the check-out of the video content may be denied 506. If the user is determined to be authorized, operations of the rental manager 212 may include determining 508 if the destination device identified in the request is authorized. For example, the customer/device database 210 may be consulted to determined if the destination device is registered with the customer and is appropriate for receiving the video content. If the destination device is not authorized, check-out of the video content may be denied 510. If the destination device and the customer are authorized, operations of the rental manager 212 may include retrieving, preparing and transferring 512 the requested video content to the destination device.

Figure 6:
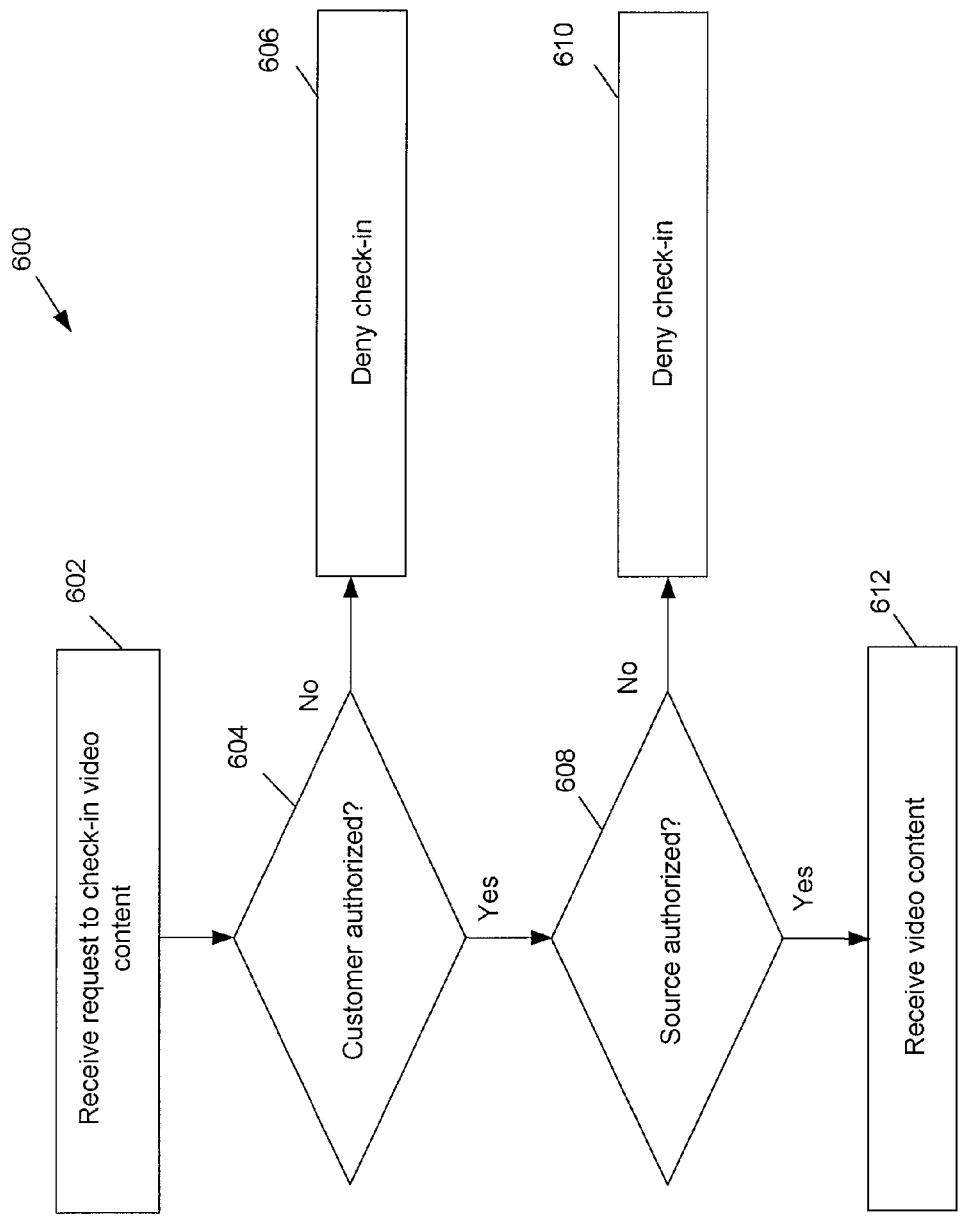

Referring to FIG. 6, a flowchart 600 represents some additional operations of the rental manager 212 (shown in FIG. 2). As mentioned above, the rental manager 212 may be executed at the video content server 202, which may be implemented as a computer system or other type of computation device. Along with being executed at a single site (e.g., video content server 202), operation execution may be distributed among two or more computation devices. For example, some operations may be executed by two or more servers.

Operations of the rental manager 212 may include receiving 602 a request to check-in video content from a source device (e.g., a computer system, etc.). Upon receipt of the request, operations of the rental manager 212 may include determining 604 if the requesting-customer is authorized to make such a request. For example, the request may be checked for appropriate customer identification information to authorize the customer. By comparing the request information with data stored in the customer/device database 210, authorization may be determined. If the customer is not authorized, the check-in of the video content may be denied 606. If the customer is determined to be authorized, operations of the rental manager 212 may include determining 608 if the source device identified in the request is authorized. For example, the customer/device database 210 may be consulted to determined if the source device is registered with the customer. If the source device is not authorized, check-in of the video content may be denied 610. If the source device and the customer are authorized, operations of the rental manager 212 may include receiving 612 the video content from the source device.

Additionally, the rental manager 212 may determine whether the destination device is capable of viewing a type or format of video content. For example, the rental manager 212 may determine whether a rented video in say standard definition (SD) or high definition (HD) may be transferred to another device, and that the transfer to device is capable of playing the rented video. If the device being transferred to is not capable of playing the particular format or definition of the video, then the transfer of the rented video would not be authorized. Also, the transfer to device may be polled or queried to determine if the device has a sufficient amount of available storage to store the rented video. If the transfer to device does not have sufficient storage, then the transfer would not be authorized, and an appropriate message to the customer may be generated identifying the low storage condition on the transfer to device. However, the transfer of the video may be queued as discussed below.

Figure 7:
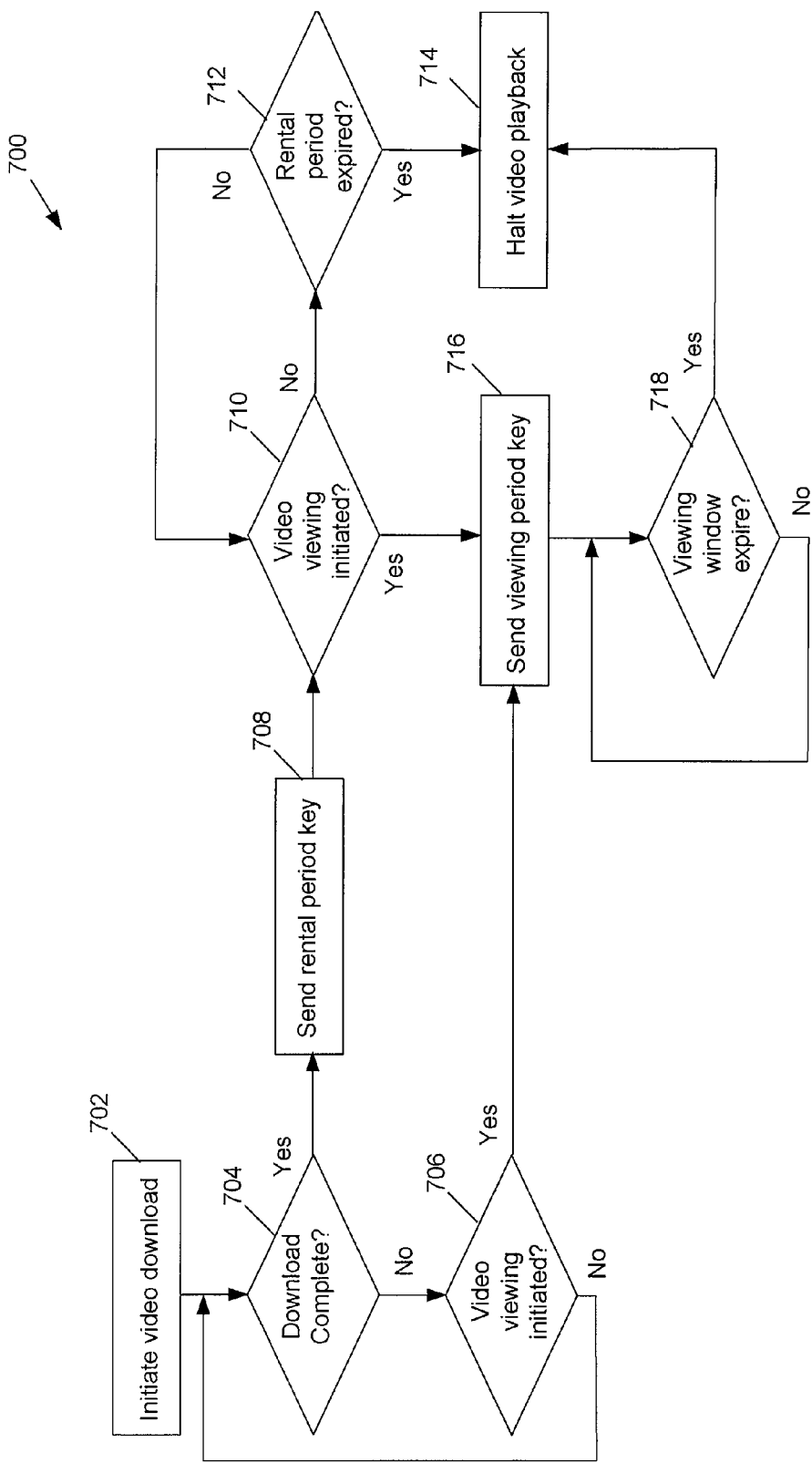
FIG. 7 is a flow chart that represent operations of a digital rights management (DRM) manager.

Referring to FIG. 7, a flowchart 700 represents some of the operations of the DRM manager 218 (shown in FIG. 2). As mentioned above, the DRM manager 218 may be executed at the DRM server 214, which may be implemented as a computer system or other type of computation device. Along with being executed at a single site (e.g., DRM server 214), operation execution may be distributed among two or more computation devices. For example, some operations may be executed by two or more servers. The DRM manager 218 may also be executed by another computation device such as the video content server 202.

Operations of the DRM manager 218 may include initiating 702 downloading of video content to an appropriate destination device (e.g., a viewing device). For example, the rental manager 212 may identify the appropriate destination device. Once initiated, operations may include determining 704 if the download has been completed and determining 706 if viewing of the video content has been initiated, if the download is not complete. If video viewing has not been complete, operations may include returning to determining 704 if the downloading of the video has been completed. If download is complete, operations may include sending a rental period key to the destination device. Typically delivery of the rental period key initiates the rental period (e.g., thirty days) and the DRM manager 218 tracks this period as it runs down.

Operations also include determining 710 if viewing of the video content has been initiated. If viewing has not started, the DRM manager 218 may determine 712 if the rental period has expired, and if it has expired video playback may be halted 714, else, if not expired, operations may include returning to determine 710 is video viewing has been initiated. If viewing has been initiated, as determined 706 after download or determined 710 after sending the rental period key 708, operations may include sending 716 a viewing period key to the destination device. Next, operations may include determining 718 if the viewing period (e.g., twenty-four hours) has expired. If expired, video playback is halted, else, the DRM manager 218 returns to determine 718 if the viewing window has expired.

In one configuration of the system, the destination device must be in communication (e.g. via the Internet) with the rental manager 212 to initiate the viewing of the rented video. For example, the rented video may be stored on a destination device. When the customer begins to view the video, the destination device will communicate with the rental manager 212 and the appropriate keys are provided to decrypt the rented video content for viewing. In this configuration, once the decryption keys are obtained, the destination device then no longer needs to communicate with the rental manager 212 for continued viewing.

In another configuration of the system, the rented content after its expiration may be automatically deleted from the destination device. For example, when a rented video expires, the destination device may check rented video content to determine if any of the video files may be deleted, thereby releasing storage space.

In another configuration of the system, the rented video content may be queued to a destination device. One reason may be because of storage constraints of the destination device. As rented video content is deleted from the destination device, then queued content is received by the destination device, thereby enabling the video rental for viewing. The queuing of the content may be managed by the rental manager 212. The customer may via the destination device (or directly via the Internet) view the video rentals in the queue. The customer may be charged for the rental of the video when the video is actually loaded onto the destination device.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The apparatus, methods, flow diagrams, and structure block diagrams described in this patent document can be implemented in computer processing systems including program code comprising program instructions that are executable by the computer processing system. Other implementations can also be used. Additionally, the flow diagrams and structure block diagrams described in this patent document, which describe particular methods and/or corresponding acts in support of steps and corresponding functions in support of disclosed structural means, can also be utilized to implement corresponding software structures and algorithms, and equivalents thereof.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art can effect alterations, modifications and variations to the examples without departing from the scope of the invention.

Other embodiments are within the scope of the following claims. The techniques described herein can be performed in a different order and still achieve desirable results.

The invention claimed is:

1. A method, comprising:
    transferring content from a content rental system to a first viewing device based upon a received request, wherein transferring content from the content rental system to the first viewing device includes initiating a content rental period and a content viewing period, content playback is allowed to exceed the expiration of the content rental period if the content viewing period has not expired;
    causing an alert to be displayed on the first viewing device that playback is discontinued if a command to pause playback is issued after expiration of the content rental period; and
    authorizing transfer of the content from the first viewing device to a second viewing device.

2. The method of claim 1, further comprising:
    upon being authorized, transferring the content from the first viewing device to the second viewing device.

3. The method of claim 1, further comprising:
    providing a key for playing back the content on the first viewing device upon receiving a request for playback.

4. The method of claim 1, in which content playback is halted upon expiration of the content rental period.

5. The method of claim 1, in which content playback is halted upon expiration of the content viewing period.

6. The method of claim 2, in which transferring the content from the first viewing device to the second viewing device includes checking the content into the content rental system.

7. The method of claim 6, in which transferring the content from the first viewing device to the second viewing device includes checking the content out of the content rental system.

8. A content rental system, comprising:
    a first data store for storing rental content; and
    a content server for transferring content to a first viewing device based upon a received request, wherein the content server is configured to initiate a content rental period and a content viewing period upon transferring the content to the first viewing device, content playback is allowed to exceed the expiration of the content rental period if the content viewing period has not expired, the content server is configured to cause an alert to be displayed on the first viewing device that playback is discontinued if a command to pause playback is issued after expiration of the content rental period, the content server is further configured to authorize the transfer of the content from the first viewing device to a second viewing device.

9. The content rental system of claim 8, further comprising:
    a second data store for storing keys for playing back the rental content; and
    a digital rights management (DRM) server for providing at least one of the stored keys for playing back the content on the first viewing device upon receiving a request for playback.

10. The content rental system of claim 8, in which the content server is configured to check content in from the first viewing device for transferring the content to the second viewing device.

11. The content rental system of claim 8, in which content playback is halted upon expiration of the content rental period.

12. The content rental system of claim 8, in which content playback is halted upon expiration of the content viewing period.

13. The content rental system of claim 8, further comprising:
    a database configured to store customer and device information for authorizing content transfers.

14. The content rental system of claim 10, in which the content server is configured to check content out to the second viewing device for transferring the content to the second viewing device.

15. One or more computer readable storage devices storing instructions that are executable by a processing device, and upon such execution cause the processing device to perform operations comprising:
    transferring content from a content rental system to a first viewing device based upon a received request, wherein transferring content from the content rental system to the first viewing device includes initiating a content rental period and a content viewing period, content playback is allowed to exceed the expiration of the content rental period if the content viewing period has not expired;
    causing an alert to be displayed on the first viewing device that playback is discontinued if a command to pause playback is issued after expiration of the content rental period; and
    authorizing transfer of the content from the first viewing device to a second viewing device.

16. The computer readable storage device of claim 15, further comprising instructions to cause the processing device to perform operations comprising:
    upon being authorized, transferring the content from the first viewing device to the second viewing device.

17. The computer readable storage device of claim 15, in which transferring the content from the first viewing device to the second viewing device includes checking the content into the content rental system.

18. The computer readable storage device of claim 15, further comprising instructions to cause the processing device to perform operations comprising:
    providing a key for playing back the content on the first viewing device upon receiving a request to for playback.

19. The computer readable storage device of claim 15, in which content playback is halted upon expiration of the content rental period.

20. The computer readable storage device of claim 15, in which content playback is halted upon expiration of the content viewing period.

21. The computer readable storage device of claim 17, in which transferring the content from the first viewing device to the second viewing device includes checking the content out of the content rental system.

22. A content rental system, comprising:
    a content server for transferring video content, based upon a received request, to a first viewing device registered with the content rental system, the content server is further configured to authorize the transfer of the video content from the first viewing device to a second viewing device registered with the content rental system, wherein transferring the content from the first to the second viewing device includes the first viewing device checking the video content into the content server and the second viewing device checking the video content out of the content server;
    the content server is further configured to initiate a content rental period and a content viewing period, wherein the content rental period defines a period of time during which playback of the video content is to be initiated and the content viewing period defines a period of time during which playback of the video content is to be completed, the content server is configured to cause an alert to be displayed on the first viewing device that playback is discontinued if a command to pause playback is issued after expiration of the content rental period;
    a first data store for storing data representative of the first and second viewing devices being registered with the content rental system and for storing data representative of customers registered with the content rental system, wherein data representative of the first and second viewing devices is associated with data representing a corresponding customer;
    a digital rights management (DRM) server for providing at least one key for decrypting video content for playback upon receiving a request for playback; and
    a second data store for storing a plurality of keys for decrypting video content for playback.

23. The content rental system of claim 22, wherein the received request is initiated by a software application executed by a computer system.

24. The content rental system of claim 22, wherein the first viewing device is a digital media receiver.

25. The content rental system of claim 22, wherein the second viewing device is a media player.

26. The content rental system of claim 23, wherein the software application is an iTunes software application.

* * * * *

UNITED STATES PATENT AND TRADEMARK OFFICE
CERTIFICATE OF CORRECTION

| | | |
|---|---|---|
| PATENT NO. | : 8,166,508 B2 | Page 1 of 1 |
| APPLICATION NO. | : 12/013850 | |
| DATED | : April 24, 2012 | |
| INVENTOR(S) | : Hiro Mitsuji | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 901 days.

Signed and Sealed this
Sixth Day of November, 2012

David J. Kappos
*Director of the United States Patent and Trademark Office*